United States Patent Office.

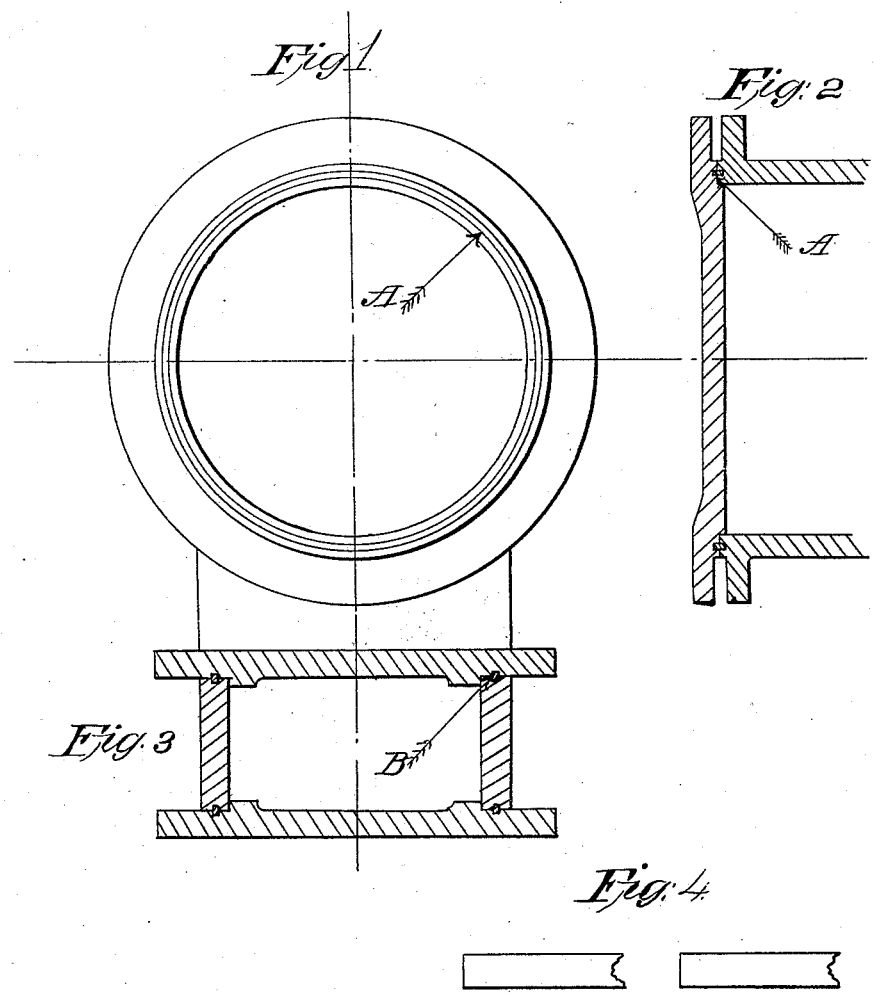

WILLIAM STAMP, OF SUSQUEHANNA DEPOT, PENNSYLVANIA.

Letters Patent No. 84,014, dated November 10, 1868.

IMPROVEMENT IN STEAM-ENGINE STEAM-CHESTS.

The Schedule referred to in these Letters Patent and making part of the same.

*To all whom it may concern:*

Be it known that I, WILLIAM STAMP, of Susquehanna Depot, in the county of Susquehanna, and State of Pennsylvania, have invented a new and improved method of making joints for all vessels wherein steam or water is confined, the same being cylinder, steam-chest, pipe, or other contrivance for holding steam or water; and I do hereby declare that the following is a full, clear, and exact description of its construction and operation, reference being had to the annexed drawings, making a part of this specification, in which—

Figure 1 represents an end elevation of a steam-cylinder, the red ring A being a wire ring, of copper, brass, or other equally non-corrosive metal. This ring is made of wire, of shape and size shown in fig. 4.

Figure 2 is a longitudinal section of same cylinder, showing rings inserted in both cylinder and cylinder-head.

Figure 3 is a transverse section of steam-chest, where B represents wire inserted in base, chest, and cover.

The operation, then, is this: Wire, drawn as shown in Figure 4, being inserted, with the concave side down, in groove prepared for that purpose, is then properly driven and hammered to thoroughly fill the groove, which, being faced off, as usually done, the joint is finished.

The value of this joint is twofold: first, that this economical use of a non-corrosive metal ring in joints, between cast or wrought-iron surfaces, preserves the same intact for a much greater length of time than they otherwise could be preserved; and, second, the joints so made are, from the first, nearer perfect, both from the greater density of the metal used, and its greater expansive quality.

What I claim, therefore, is—

The construction of the wire packing, inserted in both surfaces of the joint to be made, substantially as herein described.

WILLIAM STAMP.

Witnesses:
GAYLORD CURTIS,
WM. EMERY.